(12) United States Patent
Son (10) Patent No.: US 12,117,395 B2
(45) Date of Patent: *Oct. 15, 2024

(54) RETRO-REFLECTOMETER FOR MEASURING RETRO-REFLECTIVITY OF OBJECTS IN AN OUTDOOR ENVIRONMENT

(71) Applicant: Waymo LLC, Mountain View, CA (US)

(72) Inventor: Hui Seong Son, Hayward, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,199

(22) Filed: Sep. 27, 2022

(65) Prior Publication Data

US 2023/0020376 A1  Jan. 19, 2023

Related U.S. Application Data

(63) Continuation of application No. 16/889,485, filed on Jun. 1, 2020, now Pat. No. 11,474,037.

(51) Int. Cl.
*G01N 21/55* (2014.01)
*G01S 7/497* (2006.01)
*G01S 17/10* (2020.01)

(52) U.S. Cl.
CPC .............. *G01N 21/55* (2013.01); *G01S 7/497* (2013.01); *G01S 17/10* (2013.01);
(Continued)

(58) Field of Classification Search
CPC .............. G01N 21/55; G01N 2021/55; G01N 2021/551; G01N 2201/06113;
(Continued)

(56) References Cited

U.S. PATENT DOCUMENTS 2,755,462 A  7/1956  Britton
5,637,873 A  6/1997  Davis et al.
(Continued)

FOREIGN PATENT DOCUMENTS

CN  105136431 A  12/2015
CN  110488311 B  8/2021

OTHER PUBLICATIONS

Iyota H, Sakai H, Emura K, Igawa N, Shimada H, Nishimura N. Method for measuring solar reflectance of retroreflective materials using emitting-receiving optical fiber. Journal of Heat Island Institute International vol. 2012;7:2.
(Continued)

*Primary Examiner* — John R Lee
(74) *Attorney, Agent, or Firm* — Lowenstein Sandler LLP (57) ABSTRACT

An apparatus includes an optical emitter configured to emit a first optical signal along an optical path towards a target object in an outdoor environment. The apparatus includes an optical detector positioned collinearly with respect to the optical emitter. The optical detector is configured to detect a second optical signal that is retro-reflected from the target object. The apparatus includes a lock-in amplifier coupled to the optical detector. The lock-in amplifier is configured to generate, based on the first optical signal and the second optical signal, a signal indicative of a retro-reflectivity of the target object in the outdoor environment.

20 Claims, 5 Drawing Sheets

(52) U.S. Cl.
CPC .............. *G01N 2021/551* (2013.01); *G01N 2201/06113* (2013.01); *G01N 2201/0636* (2013.01)

(58) Field of Classification Search
CPC ... G01N 2201/0612; G01N 2201/0636; G01N 2201/063; G01S 17/00; G01S 17/02; G01S 17/04; G01S 17/06; G01S 17/10; G01S 17/88; G01S 7/497; G01S 2007/4975
USPC .................................. 250/216, 214 R, 214 A
See application file for complete search history.

(56) References Cited

U.S. PATENT DOCUMENTS

| | | | |
|---|---|---|---|
| 8,983,797 | B2 | 3/2015 | Ingram, Jr. et al. |
| 10,007,001 | B1 | 6/2018 | LaChapelle et al. |
| 10,401,480 | B1 | 9/2019 | Gaalema et al. |
| 10,948,406 | B2 * | 3/2021 | Hayashi ............. G01N 21/3554 |
| 11,474,037 | B2 * | 10/2022 | Son ......................... G01S 17/10 |
| 2019/0129674 | A1 | 5/2019 | Kuwada et al. |
| 2020/0025613 | A1 | 1/2020 | Tufillaro et al. |
| 2020/0241136 | A1 * | 7/2020 | Pang ....................... G01S 17/89 |
| 2021/0372923 | A1 * | 12/2021 | Son ......................... G01S 7/497 |
| 2023/0020376 | A1 * | 1/2023 | Son ....................... G01S 17/931 |

OTHER PUBLICATIONS

Papetti TJ, Walker WE, Keffer CE, Johnson BE. MRDF and BRDF measurements of low-scatter materials. InLaser Radar Technology and Applications XII May 4, 2007 (vol. 6550, p. 65500H). International Society for Optics and Photonics.

Rabal AM, Ferrero A, Campos J, Fontecha JL, Pons A, Rubiño AM, Corróns A. Automatic gonio-spectrophotometer for the absolute measurement of the spectral BRDF at in-and out-of-plane and retroreflection geometries. Metrologia. Feb. 27, 2012;49(3):213.

Chinese Office Action mailed on Sep. 11, 2023, on application No. 202110600473.5.

* cited by examiner

RETRO-REFLECTOMETER FOR MEASURING RETRO-REFLECTIVITY OF OBJECTS IN AN OUTDOOR ENVIRONMENT

RELATED APPLICATION

This application is a continuation application of U.S. patent application Ser. No. 16/889,485, filed on Jun. 1, 2020, the entire contents of which are hereby incorporated by reference herein.

TECHNICAL FIELD

Aspects of the disclosure relate generally to reflectometry and more specifically, relate to a retro-reflectometer for measuring the retro-reflection of physical objects in an outdoor environment.

BACKGROUND

Reflectometry uses the reflection of waves at surfaces and interfaces to detect and characterize objects. Forms of reflectometry can be classified in several ways such as by the type of radiation used, the geometry of the wave propagation, the length scales, the method of measurement, and the application domain. Electromagnetic radiation of varying wavelengths is commonly used in reflectometry. Such applications include Light Detection and Ranging (LiDAR) systems that use the reflection of electromagnetic pulses to detect the presence and to measure the location and velocity of objects.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

A reflectometer, as used herein, can refer to metrology equipment that measures the reflectivity of a surface of an object. Reflectivity can refer to a measurement of the amount of electromagnetic radiation reflected from a surface of an object.

A retro-reflectometer, as used herein, measures the reflectivity of a surface of the object in the retro-direction (e.g., retro-reflectivity). A retro-reflectometer can include an optical emitter (e.g., a light source) that emits an optical signal (e.g., a light beam) directed towards an object. The retro-reflectometer can receive and measure a retro-reflected optical signal (e.g., retro-reflected beam) reflected from a surface of the object (e.g., a building, a vehicle, a human being, an animal, a landscape element, etc.). The retro-direction can refer to the direction of propagation of the reflected optical signal towards the optical emitter where the direction of propagation is a reverse direction to the propagation of the emitted or incident beam (e.g., the angle between the optical path of the retro-reflected beam and the optical path of the emitted beam is a sharp angle which does not exceed a certain threshold value). Retro-reflectivity can refer to the reflectivity of a surface of an object in the retro-direction. "Optical signal," "light" or "beam" as used throughout this disclosure can refer to any electromagnetic radiation of any wavelength range that includes one or more wavelengths of electromagnetic radiation.

Reflectivity or retro-reflectivity can be measured as the ratio of the amount of electromagnetic radiation reflected off a surface to a reference value. For example, retro-reflectivity can be measured as a ratio of the amount (e.g., power) of electromagnetic radiation retro-reflected from a light reflecting surface of a target object to the amount of electromagnetic radiation reflected from a light reflecting surface of a Lambertian target with 100% reflectivity (i.e., 100% Lambertian target) under equivalent conditions such as the same distance range, same collection aperture size, same wavelength range and the same optical power of the emitted beam. In some implementations, this type of retro-reflectivity characterization can be referred to as the retro-reflectance factor.

Reflectivity data identifying the reflectivity of an object can be used in numerous applications, such as LiDAR systems used in autonomous vehicles or in the simulation of autonomous vehicles. For example, reflectivity data can be used to calibrate a LiDAR system, so that the reflectivity of an object detected by a LiDAR system can be used to accurately classify the object. As another example, a self-driving system of a vehicle can use reflectivity data about objects in a geofenced area, in an operational design domain (ODD) in which the vehicle operates, or in an environmental condition that the vehicle encounters to select a certain LiDAR, type of LiDAR, and/or LiDAR configuration (e.g., LiDAR transmission power level, LiDAR shot schedule, or LiDAR shot distribution) to use in that area, ODD, or environmental condition. Some reflectivity data may be available for some physical objects in various databases of material parameters, such as reflectivity data that identifies a measurement of the integration of the full scattered hemisphere of reflected light (e.g., total integrated scatter (TIS)). Further, some metrology laboratories provide reflectivity data that includes measurements of reflectivity of objects from directions materially different from the retro-direction.

However, the challenges encountered with LiDAR systems used in autonomous driving technology are unique. Specifically, while in other applications, the direction from which the light is incident on the object is typically different from the direction of sensing, in the many LiDAR systems used in autonomous vehicles, the direction of sensing is very close to (and in many instances practically indistinguishable from) the direction of the emitted signals. Accordingly, the type of reflectivity data having great utility for applications such as LiDAR used in autonomous vehicles is retro-reflectivity data that identifies retro-reflectivity of an object in an outdoor environment—which is unavailable in existing databases or from metrology laboratories for objects encountered in typical driving environments.

Aspects of the present disclosure address these and other challenges by providing a retro-reflectometer for measuring the retro-reflectivity of a target object located in an outdoor environment. In some implementations, the retro-reflectometer is a portable device that can be used in the field to measure the retro-reflectivity of target objects located in the outdoor environment. The retro-reflectometer can measure retro-reflectivity of target objects at short and long ranges (e.g., 0-200 meters). In some implementations, the retro-reflectometer can be configured in a similar manner as a LiDAR system to better approximate the retro-reflectivity sensed by the LiDAR system. For example, for a monostatic LiDAR system a retro-reflectometer can also be configured in a monostatic configuration.

In some implementations, the retro-reflectometer can include a modulator to modulate a first optical signal based on a specified modulation value. The retro-reflectometer can include an optical emitter that emits the first optical signal along an optical path towards a target object. The retro-reflectometer can include an optical detector, which is positioned collinearly with respect to the optical emitter and can detect a second optical signal that is retro-reflected from the target. The retro-reflectometer can include a lock-in amplifier that is coupled to the modulator and the detector. The lock-in amplifier can receive a first electrical signal from the modulator and a second electrical signal from the detector, and generate a third electrical signal indicative of the retro-reflectivity of the target object based on the first and second electrical signals. The first electrical signal is representative of the first optical signal and the second electrical signal is representative of the second optical signal.

In some implementations, the retro-reflectometer can be configured in a monostatic configuration where the optical emitter and the optical detector are positioned collinearly, such that the optical path of the emitted optical signal and the optical path on which the retro-reflective optical signal travels to the detector make a small angle (e.g., less than a threshold angle) with each other. In other implementations, the two optical paths can share, at least in part, the same optical path. For example, a beam splitter can be used to ensure that the portion of the optical path of the emitted optical signal (e.g., from the beam splitter to the target) coincides with the portion of the optical path of the retro-reflected optical signal (e.g., from the target to the beam splitter) while enabling separation of the two optical signals inside an optical detection unit.

In some implementations, the electrical signal from the lock-in amplifier can be used to generate retro-reflectivity data that identifies a measurement of the retro-reflectivity of the target object at the measured range from the retro-reflectometer. In some implementations, one or more signals characterizing the retro-reflectivity data can be provided to a LiDAR system to calibrate the LiDAR system for classification of objects based on reflectivity.

Figure 1:
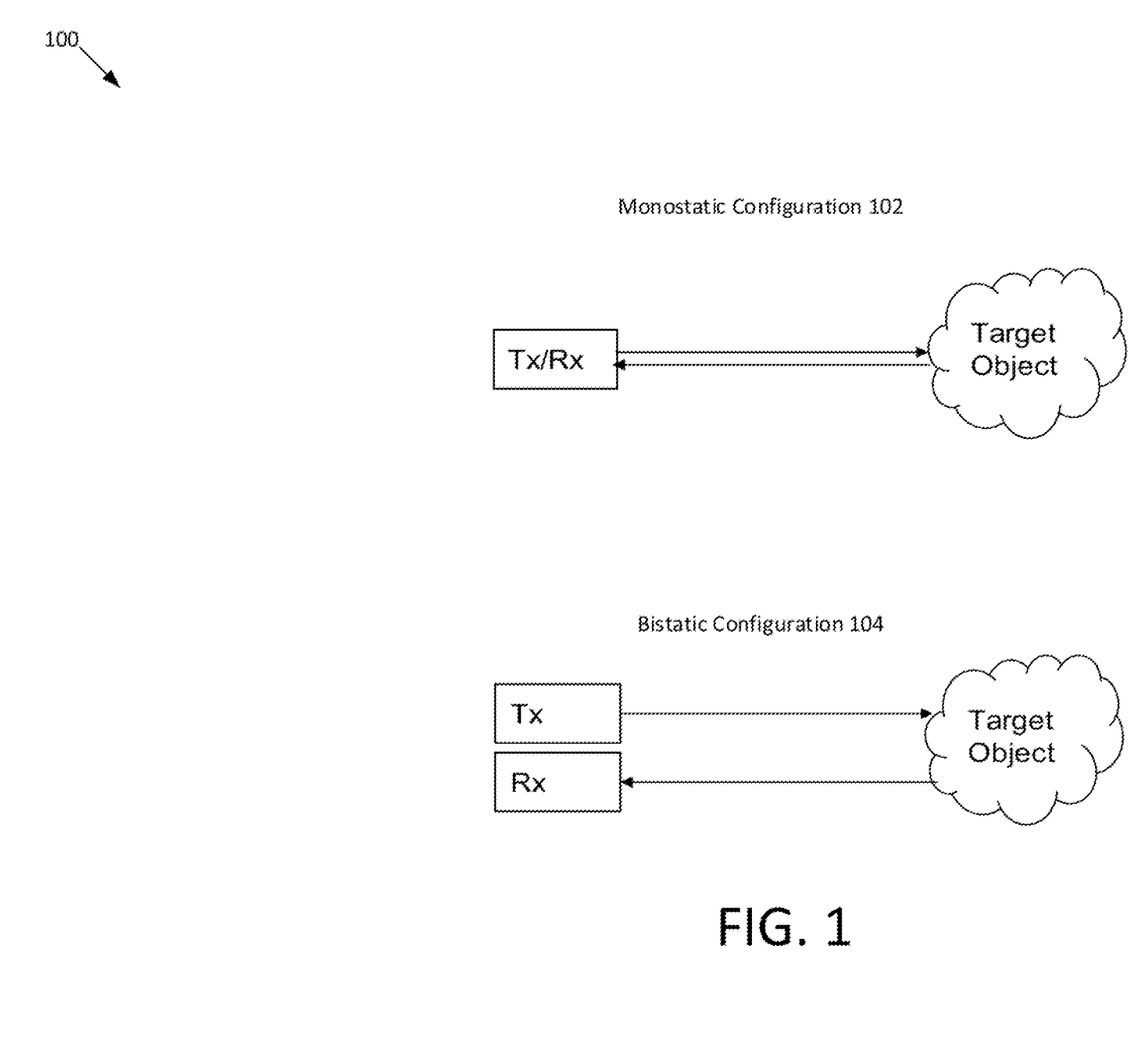
FIG. 1 is a diagram illustrating a monostatic configuration and a bistatic configuration of systems, in accordance with some implementations of the disclosure.

FIG. 1 is a diagram illustrating a monostatic configuration and a bistatic configuration of a system, in accordance with some implementations of the disclosure.

Systems, such as radar systems, LiDAR systems and metrology systems among others, can be configured in one or more of a monostatic configuration 102 or bistatic configuration 104. For purposes of illustration, rather than limitation, reflectometers and LiDAR systems are discussed as examples of systems having a monostatic configuration 102 and/or bistatic configuration 104.

A system having a monostatic configuration 102 (e.g., monostatic system) has one or more of the following characteristics. In some implementations, a monostatic system includes transmitter (TX) (e.g., an emitter, such as an optical emitter) that is co-located with the receiver (RX), such as an optical detector (also referred to as a "detector" herein). For example, both the transmitter and the receiver can be co-located in the same instrument or the same housing. In some implementations, a monostatic system can include a common transmit and receive optical unit. For example, an optical unit (including one or more lenses, one or more aperture units, or one or more mirrors, for example) of the transmitter and receiver is a shared optical unit. The optical emitter and the optical detector may be collinearly positioned, such that the optical axis of the optical emitter matches the optical axis of the optical detector or the distance between the two axes is less than a predefined threshold distance. In some implementations, the predefined threshold distance can include a distance between the two axes (e.g., parallel axes) that is less than or equal to two times the focal length of the system. In some implementations, an optical axis can be represented by a line passing through a point of an object (e.g., optical detector or optical emitter). For example, the optical axis can pass through the center of and be orthogonal to the light detecting surface of the optical detector or to the output of the optical emitter. The threshold distance between the axes is chosen in a manner that would provide for the optical detector to receive at least a certain share of the retro-reflected optical signal. In other words, the mutual positioning of the optical emitter and the optical detector should result in a sharp angle not exceeding a predefined threshold angle between the optical paths of the emitted and received optical signals. In some implementations, the predefined threshold angle can be less than or equal to 2 degrees.

In some implementations, the optical emitter of a monostatic system can emit an optical signal that travels along an optical path towards a target object and the retro-reflected optical signal can return to a detector of a monostatic system along the same optical path (at least in part). The optical path can refer to a path the light takes in travelling through an optical medium (e.g., air) or system. In some implementations, the same optical path of the emitted and received optical signals can include an angle between the optical paths of the emitted and received optical signal that does not exceed a predefined threshold angle (e.g., less than or equal to 2 degrees).

A system having a bistatic configuration 104 (e.g., bistatic system) has one or more of the following characteristics. In some implementations, a bistatic system can include a transmitter and the receiver separated by some distance. For example, the transmitter can be located in a first instrument and the receiver can be located in a second instrument that is located many meters away from the transmitter such that the angle between the transmit optical path and the receive optical path exceeds a threshold (e.g., greater than 10 degrees). In some implementations, a bistatic system can have separate transmit and receive optical units. For example, the receiver can have an optical unit and the transmitter can have a separate optical unit. In some implementations, a bistatic system has an emitted optical signal with a different optical path than the reflected optical signal.

Accordingly, aspects of the disclosure provide improved measurements of objects located in an outdoor environment using a retro-reflectometer that can be configured to better approximate retro-reflectivity sensed by a LiDAR system. The retro-reflectometer can be used to provide a signal indicative of the retro-reflectivity associated with an object as a calibration signal to a LiDAR system.

Figure 2:
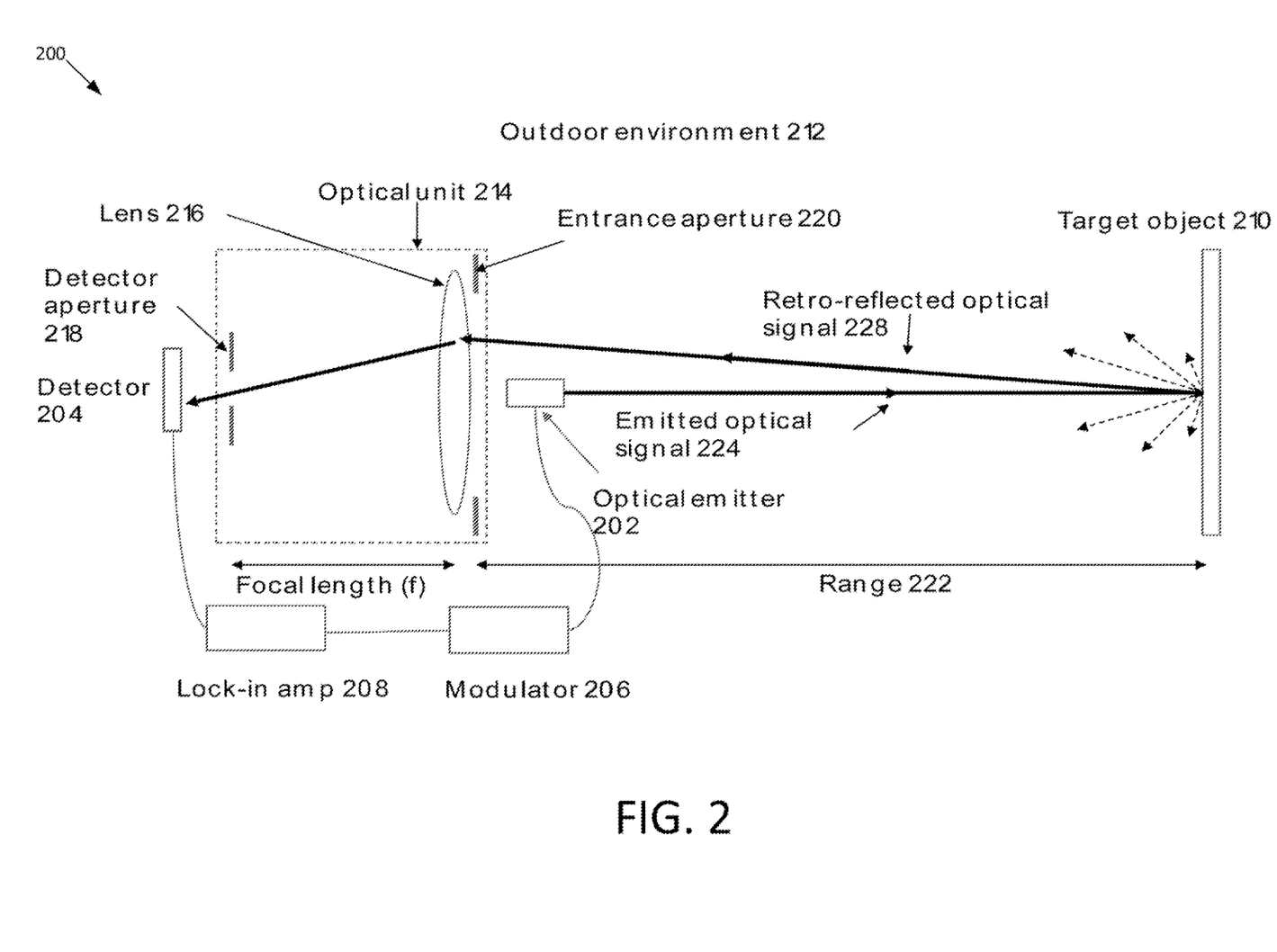
FIG. 2 is a diagram of a retro-reflectometer, in accordance with some implementations of the disclosure.

FIG. 2 is a diagram of a retro-reflectometer, in accordance with some implementations of the disclosure. For purposes of illustration rather than limitation, retro-reflectometer 200 is shown in a monostatic configuration.

In some implementations, the retro-reflectometer 200 (also referred to as "optical retro-reflectometer" herein) is configured to measure the retro-reflectivity of a target object 210 located in an outdoor environment 212. In contrast to laboratory-based metrology equipment used to measure reflectivity of an object in a controlled laboratory environment, retro-reflectometer 200 is configured to measure retro-reflectivity of target objects (e.g., tree, automobile, building, etc.) that typically cannot be relocated to a metrology laboratory. Retro-reflectometer 200 is further configured to measure retro-reflectivity of a target object 210 in situ where elements that affect retro-reflectivity and the measurement thereof (e.g., humidity, rain, air quality or sunlight) are not controlled. In some implementations, the retro-reflectometer 200 is portable and can be moved to and operate at different locations in the outdoor environment 212 to measure the retro-reflectivity of different target objects. For example, the components of retro-reflectometer 200 can be contained in a common housing. In another example, retro-reflectometer 200 can be transported in or mounted to a vehicle. Retro-reflectometer 200 can also measure the retro-reflectivity of a target object at different ranges (e.g., 2-200 meters).

In some implementations, the components of retro-reflectometer 200 can be similar to or arranged in a similar manner as a LiDAR system. By configuring a retro-reflectometer 200 in a manner similar to a LiDAR system, the measured retro-reflectivity at the retro-reflectometer 200 can more closely approximate the retro-reflectivity of an object sensed by a LiDAR system.

In some implementations, the retro-reflectometer 200 includes an output interface to provide a signal representative of the retro-reflectivity associated with the target object 210 as a calibration signal to a LiDAR system. For example, retro-reflectivity data (described further below) that identifies a measurement of the retro-reflectivity of the target object 210 at a particular range(s) 222 from retro-reflectometer 200 can be provided to a LiDAR system (or LiDAR simulation system) to calibrate the LiDAR system for detection or classification of objects based on retro-reflectivity. For example, a LiDAR system can be calibrated by measuring return optical power as a function of emitted optical power and range for a known reflectivity target. To perform the LiDAR calibration, the retro-reflectivity of the target (e.g., retro-reflectivity data) should be known so that calibration is performed using a consistent unit to unit baseline for determining relative reflectivity (e.g. reflectivity compared to a 100% Lambertian target). The retro-reflectometer, as described herein, can be used to determine or verify the retro-reflectivity of the target. In practice using a LiDAR system distance range can be determined independently by the time of flight signal, but the return optical power can be compared to this calibration curve for a specific distance value to determine the relative retro-reflectivity.

In some implementations, retro-reflectometer 200 can include optical emitter 202, optical unit 214, optical detector 204 (also referred to as "detector 204" herein), lock-in amplifier 208, and modulator 206. The detector 204 and modulator 206 can electrically couple to the lock-in amplifier 208. The optical emitter 202 can electrically couple to the modulator 206. In some implementations, retro-reflectometer 200 can include a processing device (not shown). The processing device can send and receive signals to one or more of the detector 204, lock-in amplifier 208, optical emitter 202, or modulator 206. For example, the processing device can function as a controller to control the operation of one or more of the detector 204, lock-in amplifier 208, optical emitter 202, or modulator 206. In another example, the processing device can be used to generate retro-reflectivity data (described below) for the target object 210.

In some implementations, modulator 206 is electrically coupled to the lock-in amplifier 208 and optical emitter 202. In some implementations, modulator 206 modulates the emitted optical signal 224 emitted from optical emitter 202 based on a modulation value. In some implementations, modulator 206 can be a particular type of modulator such as frequency, amplitude, or phase modulator. For purposes of illustration, rather than limitation, modulator 206 includes a frequency modulator, unless otherwise described. In some implementations, the modulator 206 stores a modulation value that indicates a frequency of modulation. For instance, the frequency of modulation can be 18 Hertz or some other frequency. In some implementations, the modulator 206 can send an electrical signal to the lock-in amplifier 208 that is indicative of the emitted optical signal 224 at the modulation value.

In some implementations, optical emitter 202 emits an optical signal (e.g., optical beam) (also referred to as "emitted modulated optical signal" herein) at a wavelength range and at a modulation value (e.g., frequency) along an optical path towards the target object 210 located in the outdoor environment 212. The arrow that represents the emitted optical signal 224 also represents the optical path of the emitted optical signal 224. In some implementations, optical emitter 202 includes a collimated optical emitter that emits a collimated optical signal (e.g., collimated beam). In some implementations, the wavelength range of the emitted optical signal 224 is the same wavelength range used in the corresponding LiDAR system for which the retro-reflectivity data is generated.

In some implementations, the optical emitter 202 may be a narrow-band source (e.g., a laser, a light-emitting diode). Alternatively, optical emitter 202 may include two or more narrow-band sources of light (e.g., two or more lasers operating at different wavelengths). In some implementations, optical emitter 202 may include one or more broadband sources of light. In some implementations, the wavelength(s) of the emitted optical signal 224 may be in the IR, visible, or UV parts of the electromagnetic spectrum.

As illustrated, the emitted optical signal 224 is directed towards target object 210. The emitted optical signal 224 travels a range 222, which is some distance between the retro-reflectometer 200 and a light reflecting surface of the target object 210. The emitted optical signal 224 strikes a light reflecting surface of the target object 210 at an angle of incidence (e.g., at roughly 90 degrees as depicted). Some of the emitted optical signal 224 is scattered in various directions and away from the retro-reflectometer 200, as depicted by dashed arrows. Some of the emitted optical signal 224 is retro-reflected back towards the retro-reflectometer 200 as illustrated by retro-reflected optical signal 228 (also referred to as "retro-reflected modulated optical signal" herein). Solid arrows (3 solid arrows) pointing in the retro-direction illustrate the optical path of the retro-reflected optical signal 228. As illustrated, the retro-reflected optical signal 228 returns to the retro-reflectometer 200. The optical path of the emitted optical signal 224 and the retro-reflected optical signal 228 share the same optical path between the retro-reflectometer 200 and the target object 210. As illustrated, the optical unit 214 of the retro-reflectometer 200 receives the retro-reflected optical signal 228 and directs the retro-reflected optical signal 228 to the detector 204.

In some implementations, the detector 204 (also referred to as "light detector" herein) detects the retro-reflected optical signal 228. The detector 204 can include a transducer that converts an optical signal (e.g., retro-reflected optical signal 228) into an electrical signal. The optical signal obtained by the detector 204 may be converted into an electrical signal that is indicative of the retro-reflected optical signal 228 received at the detector 204. The electrical signal generated at the detector 204 can be sent to the lock-in amplifier 208. The relationship between the electrical signal yielded by the optical detector 204 and the input optical signal 228 may, in various implementations, be described by a linear function (at least within a predefined range of parameters characterizing the input optical signal 228) or a non-linear function of a known type.

The detector 204 may include one or more photo-diodes, phototransistors, photo-resistors, photo-multipliers, photovoltaic devices, spectrometers, diffraction gratings, or any other optical detection devices.

In some implementations, the lock-in amplifier 208 can include an electronic device that can separate a desired signal (e.g., an electrical signal representative of the retro-reflected modulated optical signal 228) from one or more noise components. The electrical signal representative of the emitted optical signal may be received from the modulator 206 and can be used as a reference signal to the lock-in amplifier 208. The electrical signal representative of the received optical signal may be received from the detector 204 and can be used as an input signal to the lock-in amplifier 208. The electrical signal from the detector 204 can include noise components due to various optical phenomena existing in the outdoor environment 212 (e.g., ambient light), making the desired information (e.g., retro-reflected modulated optical signal 228) difficult to ascertain. The lock-in amplifier 208 can phase-align the reference signal from the modulator 206 and the input signal from the detector 204, amplify the input signal received from the detector 204 based on the reference signal received from the modulator 206, integrate the amplified signal, filter out noise components around the modulation frequency, and remove any direct current (DC) offset. Using the reference signal and the input signal, lock-in amplifier 208 generates an electrical signal that is indicative of the retro-reflectivity of the target object that is located in the outdoor environment 212. In particular, the electrical signal generated by the lock-in amplifier 208 can be indicative of the electrical power (Watts) of the retro-reflected optical signal 228 (at the wavelength range). In some implementations, the retro-reflectivity data is determined based on the electromagnetic power of the retro-reflected optical signal 228, the electromagnetic power of the emitted optical signal 224, and a range 222 between the retro-reflectometer 200 and the light reflecting surface of the target object 210.

Retro-reflectometer 200 further illustrates a dioptric type retro-reflectometer that uses an optical unit 214 (e.g., collection optics) having refractive elements (e.g., lens elements) that direct retro-reflected optical signal 228 to the detector 204. In some implementations, the optical unit 214 of retro-reflectometer 200 can include an entrance aperture 220, lens 216, optical detector 204, and detector aperture 218.

In some implementations, lens 216 of optical unit 214 can include a converging (e.g., convex) lens positioned along the optical path of the retro-reflected optical signal 228. In some implementations, the lens 216, the detector 204, and the output of the optical emitter 202 are positioned collinear to one another, e.g. close to a reference axis (e.g., the optical axis of the lens 216, the optical path of the emitted optical signal 224, and the like).

In some implementations, the entrance aperture 220 of optical unit 214 is positioned along the optical path of the retro-reflected optical signal 228 and between the lens 216 and the output of the optical emitter 202. The size of the entrance aperture 220 can control the amount of the solid angle of the retro-reflected optical signal 228 that the retro-reflectometer 200 collects, and can be chosen to replicate a corresponding LiDAR system. For example, if a particular LiDAR has a small entrance aperture (e.g., collection aperture), then the entrance aperture 220 having similar dimensions can be implemented in retro-reflectometer 200.

In some implementations, the detector aperture 218 of the optical unit 214 is positioned along the optical path of the retro-reflected optical signal 228 and between the detector 204 and the lens 216. Focal length (f) is illustrated as the distance between lens 216 and detector aperture 218. In some implementations, the entrance aperture 220 and the detector aperture 218 may be circular and coaxial. Alternatively, the entrance aperture 220 and the detector aperture 218 may be non-circular and/or have a lateral offset relative to each other so as to control the amount (and the direction) of the retro-reflected optical signal 228 that reaches the detector 204.

In other implementations, the optical emitter 202 (or output thereof) of retro-reflectometer 200 in a monostatic configuration can be located in different locations. In other implementations, the optical emitter 202 (or output thereof) is located between the lens 216 and the detector aperture 218 (at for example, the same optical axis). In another implementation, the optical emitter 202 (or output thereof) can be located behind the detector aperture where the light is emitted through the detector aperture 218. In some implementations, a beam splitter can be used in conjunction with the optical emitter 202. For example, the optical emitter 202 can be configured with a beam splitter so that the output of the optical emitter 202 is emitted through the detector aperture 218 but the body of the optical emitter 202 is located elsewhere to prevent the occlusion of the light-sensitive surface of the detector 204.

Figure 3:
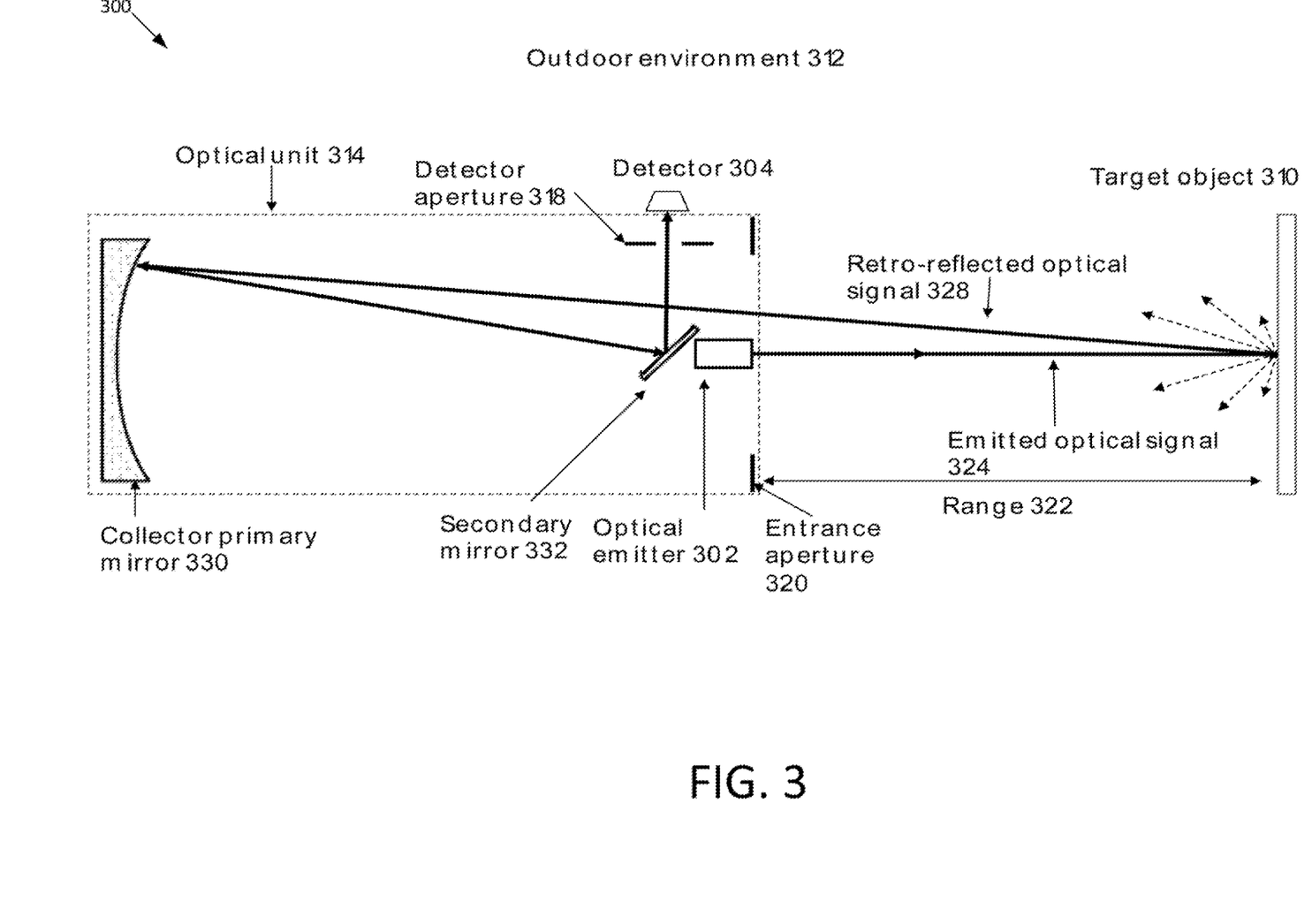
FIG. 3 is a diagram of a retro-reflectometer, in accordance with some implementations of the disclosure.

FIG. 3 is a diagram of a retro-reflectometer, in accordance with some implementations of the disclosure. For purposes of illustration, rather than limitation, retro-reflectometer 300 is shown in a monostatic configuration. It can be noted that for the sake of brevity, rather than limitation, not all the elements depicted in FIG. 3 are described below. Rather, the descriptions of similar elements described herein, and in particular with respect to FIG. 2, apply to the elements of FIG. 3, unless otherwise described. Further, for the sake of brevity, rather than limitation, elements (and their descriptions) of FIG. 2 that are not illustrated in FIG. 3 apply to FIG. 3, unless otherwise described. In particular, the lock-in amplifier 208 and modulator 206 of FIG. 2 can be configured and used in a similar manner with respect to retro-reflectometer 300 of FIG. 3.

It can be further noted that the optical unit 314 of retro-reflectometer 300 illustrates a different type of optical unit from optical unit 214 of retro-reflectometer 200, and will be further described with respect to FIG. 3. Retro-reflectometer 300 illustrates a catoptric type retro-reflectometer that uses optical unit 314. A catoptric type retro-reflectometer 300 uses an optical unit 314 with reflective elements (e.g., one or more mirrors) to direct the retro-reflected optical signal 328 to the detector 304. Alternatively, a catadioptric type retro-reflectometer (not shown) can be implemented using elements described herein.

In some implementations, the optical axis of the collector primary mirror 330 of optical unit 314 is positioned along the optical path of the retro-reflected optical signal 328.

In some implementations, the secondary mirror 332 is also positioned along the optical path of the retro-reflected optical signal 328. The secondary mirror is positioned to receive the retro-reflected optical signal 328 that is reflected from the collector primary mirror 330 and to direct the retro-reflected optical signal 328 to the detector 304. In some implementations, the collector primary mirror 330, the secondary mirror 332, and the output of the optical emitter 302 are positioned collinear to one another, e.g., close to a reference axis (e.g., the optical path of the retro-reflected optical signal 228). In some implementations, the optical emitter 302 (or output thereof) is positioned in the optical unit 314 between the secondary mirror 332 and entrance aperture 320 (e.g., behind the secondary mirror 332).

In some implementations, the entrance aperture 320 of optical unit 314 is positioned along the optical path of the retro-reflected optical signal 328 and positioned collinear to one or more of the collector primary mirror 330, the secondary mirror 332, and the output of the optical emitter 302. The secondary mirror 332 is positioned between the collector primary mirror 330 and the output of the optical emitter 302. The secondary mirror 332 can be a flat mirror, a concave mirror, or a convex mirror. As shown, the direction of the optical axis of the secondary mirror 332 can be different from the optical axis of the primary mirror 330.

In some implementations, the detector aperture 318 is positioned along the optical path of the retro-reflected optical signal 328 and positioned non-collinear to the collector primary mirror 330, the secondary mirror 332, and the output of the optical emitter 302.

It can be noted that the range (e.g., range 222 or range 322) can be determined by any number of techniques and/or types of range finding devices, such as a laser range finder or LiDAR device. A range finding device can determine a range between the range finding device (or retro-reflectometer) and a target object. In some implementations, any range finding device can be implemented with or be part of retro-reflectometer 200 or retro-reflectometer 300 and used to determine range.

In other implementations, the optical emitter 302 (or output thereof) of retro-reflectometer 300 in a monostatic configuration can be located in different locations. In still other implementations, the optical emitter 302 (or output thereof) is located outside the optical unit 314. For example, the optical emitter 202 is located between the entrance aperture 320 and target object 310. In some implementations, a beam splitter can be used in conjunction with the optical emitter 302. In some implementations, the focal length can include the distance between the collector primary mirror 330 and the secondary mirror 332 combined with the distance between the secondary mirror 332 and the detector 304.

In other implementations, retro-reflectometer 200 or retro-reflectometer 300 can be configured in a bistatic configuration. The use of such a retro-reflectometer 200 or retro-reflectometer 300 can be advantageous to generate reflectivity data for LiDAR systems that are implemented in a bistatic configuration. In some implementations, in a bistatic retro-reflectometer the optical emitter can be moved so that the emitted optical signal and the retro-reflected optical signal do not share the same optical path. In a bistatic configuration, the other elements (apart from the optical emitter) of retro-reflectometer 200 or retro-reflectometer 300 can be implemented in a similar manner as described herein.

Figure 4:
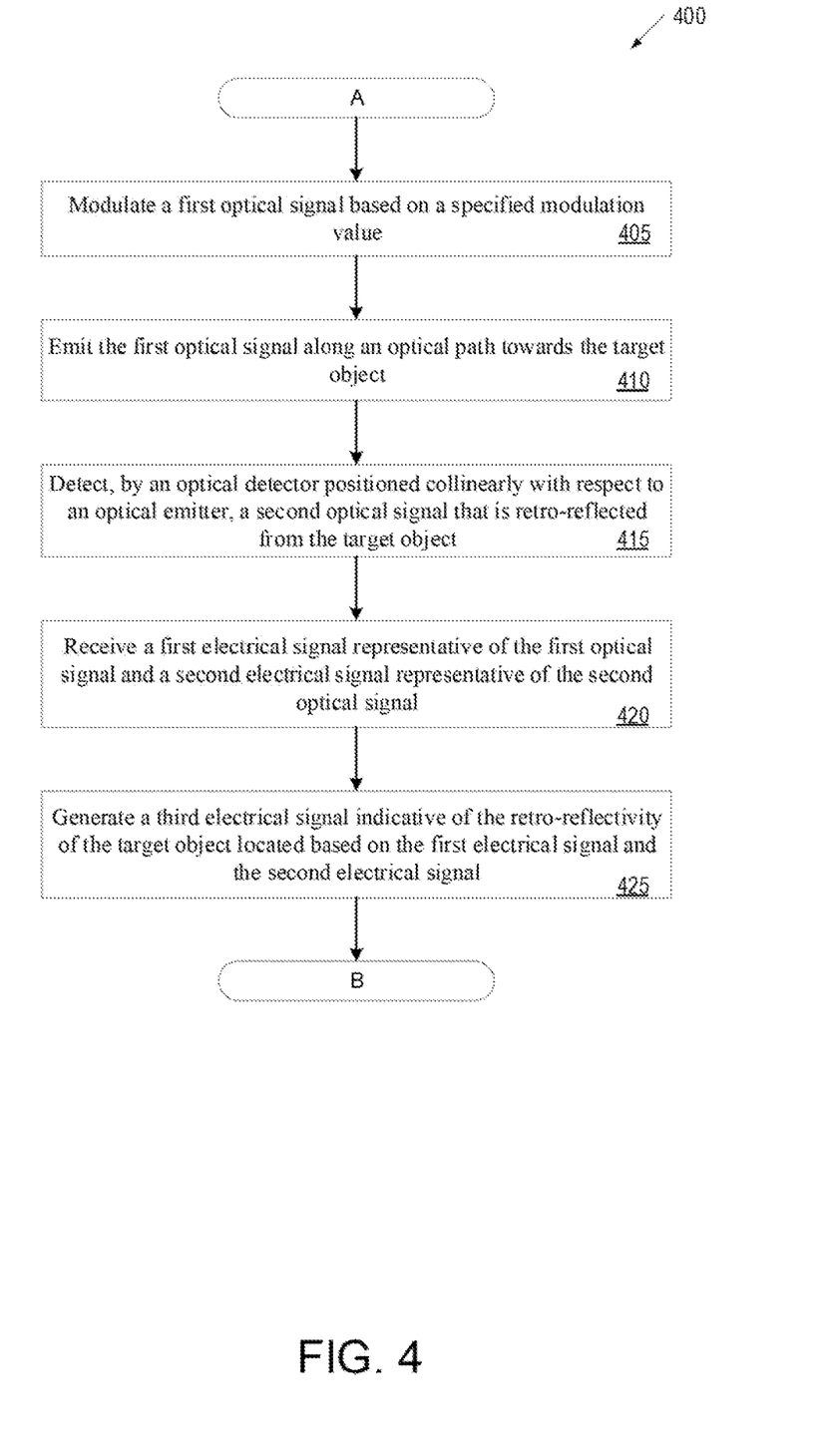
FIG. 4 illustrates a flow diagram for measuring retro-reflectivity of a target object, in accordance with some implementations of the disclosure.

FIG. 4 illustrates a flow diagram for measuring retro-reflectivity of a target object in an outdoor environment, in accordance with some implementations of the disclosure.

Elements of FIGS. 2 and 3 may be described below to help illustrate method 400 of FIG. 4. It may be noted that method 400 may be performed in any order and may include the same, different, more, or fewer operations. It may be further noted that method 400 may be performed by one or more elements of a retro-reflectometer, such as retro-reflectometer 200 or retro-reflectometer 300. In other implementations, a different type of retro-reflectometer or the elements thereof can be used to perform one or more of the operations of method 400.

At operation 405, the retro-reflectometer modulates a first optical signal based on a specified modulation value At operation 410, the retro-reflectometer emits the first optical signal along an optical path towards a target object that can be located in the outdoor environment.

At operation 415, the retro-reflectometer detects, by an optical detector positioned collinearly with respect to an optical emitter, a second optical signal that is retro-reflected from the target object.

At operation 420, the retro-reflectometer receives a first electrical signal representative of the first optical signal and a second electrical signal representative of the second optical signal.

At operation 425, the retro-reflectometer generates a third electrical signal indicative of the retro-reflectivity of the target object based on the first electrical signal and the second electrical signal.

In some implementations, the first electrical signal is received from a modulator of the retro-reflectometer and is indicative of the specified modulation value of the first optical signal. In some implementations, the second electrical signal is received from an optical detector of the retro-reflectometer. In some implementations, the third electrical signal is generated by a lock-in amplifier of the retro-reflectometer and is indicative of a light intensity of the second optical signal.

In some implementations, generating the third electrical signal includes aligning the first electrical signal and the second electrical signal based on phase (e.g., phase alignment), amplifying the second electrical signal, and filtering the noise components of the second electrical signal. In some implementations, the retro-reflectometer determines retro-reflectivity data based on light intensity of the second optical beam, light intensity of the first optical beam, and a distance between an output of the optical emitter and a light reflecting surface of the target object. In some implementations, the retro-reflectivity data identifies a measurement of the retro-reflectivity of the target object within a predefined distance range from the optical emitter.

In some implementations, the retro-reflectometer provides a signal indicative of the retro-reflectivity associated with the target object as a calibration signal to a Light Detection and Ranging (LiDAR) system.

In some implementations, an output of the optical emitter and the optical detector are positioned in a monostatic configuration where the optical path of the first optical signal and an optical path on which the second optical signal travels to the optical detector share at least in part the same optical path.

In some implementations, a converging lens of an optical unit (of a dioptric type retro-reflectometer) is positioned along the optical path. The converging lens, the optical detector, and the output of the optical emitter are collinearly positioned (e.g., monostatic configuration). In some implementations, the optical unit includes an entrance aperture positioned along the optical path and between the converging lens and the optical emitter, and a detector aperture positioned along the optical path between the optical detector and the converging lens.

In some implementations, a collector primary mirror of an optical unit (or a catoptric type retro-reflectometer) is positioned along the optical path. A secondary mirror of the optical unit is positioned along the optical path so as to receive the second optical signal that is reflected from the collector primary mirror. The collector primary mirror, the secondary mirror, and the output of the optical emitter are collinearly positioned. In some implementations, an entrance aperture is positioned along the optical path and collinearly positioned with the collector primary mirror, the secondary mirror, and the output of the optical emitter. The secondary mirror is positioned between the collector primary mirror and the output of the optical emitter. A detector aperture is positioned along the optical path and non-collinearly positioned with the collector primary mirror, the secondary mirror, and the output of the optical emitter.

Figure 5:
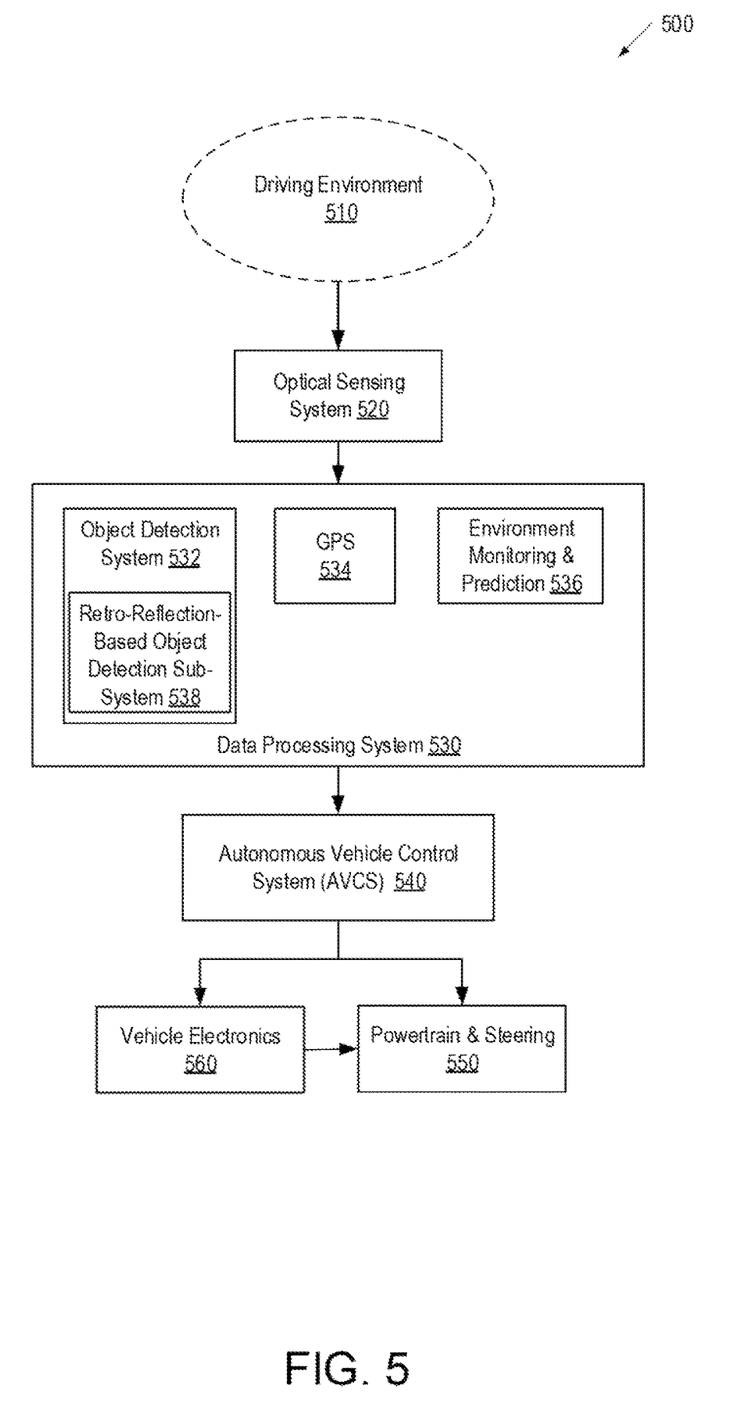
FIG. 5 is a diagram illustrating components of an exemplary autonomous vehicle that uses electromagnetic sensing and an autonomous driving system trained using retro-reflection data, in accordance with some implementations of the disclosure.

FIG. 5 is a diagram illustrating components of an exemplary autonomous vehicle that uses electromagnetic sensing and an autonomous driving system trained using retro-reflection data, in accordance with some implementation of the present disclosure. FIG. 5 illustrates operations of the exemplary autonomous vehicle (AV) as used under actual driving conditions. Autonomous vehicles may include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles capable of being operated in a self-driving mode (without a human input or with a reduced human input).

Autonomous (self-driving) vehicles operate by sensing an outside environment with various electromagnetic (radar and optical) sensors and charting a driving path through the environment based on the sensed data. Additionally, the driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, streetlights, etc.) is obtained from contemporaneous electromagnetic sensing data. Precision and safety of the driving path and of the speed regime selected by the autonomous vehicle depend significantly on the accuracy and completeness of the sensing data and on the ability of a driving algorithm to process the sensing data quickly and efficiently and to output correct instructions to the vehicle controls and the drivetrain.

An autonomous vehicle may employ LiDAR technology to detect distances to various objects in the environment and the velocities of such objects. A LiDAR emits one or more laser signals (pulses) that travel to an object and detects the arrived signals retro-reflected back from the object. By determining a time delay between the signal emission and the arrival of the retro-reflected waves, the LiDAR can determine a distance to the object. Furthermore, the LiDAR can determine the velocity (speed and direction of motion) of the object by emitting two or more signals in a quick succession and detecting a changing position of the object with each additional signal. The intervals between successive signals can be short enough so that in the meantime the object does not change its position appreciably in relation to other objects of the environment, but still long enough to allow the LiDAR to detect small changes in the object's position with a high accuracy. In some instances, LiDAR can determine the velocity of the object by emitting one or more signals and measuring the doppler shift of the return signal(s), as can be the case for coherent LiDAR systems.

A driving environment 510 may include any objects (animated or non-animated) located outside the AV, such as roadways, buildings, trees, bushes, sidewalks, bridges, mountains, other vehicles, pedestrians, and so on. The driving environment 510 may be urban, suburban, rural, and so on. In some implementations, the driving environment 510 may be an off-road environment and/or an environment of a wilderness. In some implementations, the driving environment may be an indoor environment, e.g., the environment of an industrial plant, a shipping warehouse, a hazardous area of a building, and so on. In some implementations, the driving environment 510 may be substantially flat, with various objects moving parallel to a surface (e.g., parallel to the surface of Earth). In other implementations, the driving environment may be three-dimensional and may include objects (e.g., aircraft, submarines) that are capable of moving along all three directions. Hereinafter, the term "driving environment" will be understood to include all environments in which an autonomous motion of self-propelled vehicles may occur. For example, "driving environment" shall include any possible flying environment of an aircraft or a marine environment of a naval vessel. The objects of the driving environment 510 may be located at any distance from the AV, from close distances of several feet (or less) to several miles (or more).

The exemplary AV 500 may include an optical sensing system 520. The optical sensing system 520 may include various electromagnetic sensing subsystems and/or devices (e.g., distance sensing, velocity sensing, acceleration sensing, rotational motion sensing, and so on). For example, "optical" sensing may utilize a range of light visible to a human eye (e.g., the 380 to 700 nm wavelength range), the UV range (below 380 nm), the infrared range (above 700 nm), the microwave range (between 1 mm and 1 m), the radio frequency range (above 1 m), etc. In implementations, "optical" and "light" may include any other suitable range of the electromagnetic spectrum.

The optical sensing system 520 may include a radar unit, which may be any system that utilizes radio frequency signals to sense objects within the driving environment 510 of the AV 500. The radar unit may be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "velocity" may also include an angular velocity of the object's rotational motion.

The optical sensing system 520 may include a LiDAR unit (e.g., a LiDAR rangefinder), which may be a laser-based (or maser-based) unit capable of determining distances (e.g., using the time of signal propagation technology) to the objects in the driving environment 510. The LiDAR unit may utilize wavelengths of electromagnetic waves that are shorter than the wavelength of the radio waves and may, therefore, provide a higher spatial resolution and sensitivity compared with the radar unit. The LiDAR unit may include one or more laser sources to produce emitted signals and one or more detectors of the signals reflected from the objects. The LiDAR unit may include spectral filters to filter out spurious electromagnetic waves having wavelengths (frequencies) that are different from the wavelengths (frequencies) of the emitted signals. In some implementations, the LiDAR unit may include directional filters (e.g., apertures, diffraction gratings, and so on) to filter out electromagnetic waves that may arrive at the detectors along directions different from the retro-reflection directions for the emitted signals. The LiDAR unit may use various other optical components (lenses, mirrors, gratings, optical films, interferometers, spectrometers, local oscillators, and the like) to enhance sensing capabilities of the unit. The LiDAR unit may be configured to operate in an incoherent sensing mode or a coherent sensing mode (e.g., a mode that uses heterodyne detection).

In some implementations, the LiDAR unit may be a 360-degree unit in a horizontal direction. In some implementations, the LiDAR unit may be capable of spatial scanning along both the horizontal and vertical directions. In some implementations, the LiDAR field of view may be 90 degrees in the vertical direction (so that the entire upper hemisphere is covered by the LiDAR signals). In some implementations, the LiDAR field of view may be a full sphere (consisting of two hemispheres). For brevity and conciseness, when a reference to "LiDAR technology," "LiDAR sensing," "LiDAR data," "LiDAR system," and "LiDAR," in general, is made in the present disclosure, such reference shall be understood also to encompass other electromagnetic sensing technology, such as the radar technology, where applicable.

The optical sensing system 520 may further include one or more cameras to capture images of the driving environment 510. The images may be two-dimensional projections of the driving environment 510 (or parts of the driving environment 510) onto a projecting surface (flat or non-flat) of the camera. Some of the cameras of the optical sensing system 520 may be video cameras configured to capture continuous (or quasi-continuous) stream of images of the driving environment 510.

The optical sensing data obtained by the optical sensing system 520 may be processed by a data processing system 530 of the AV 500. For example, the optical sensing system 520 may include an object detection system 532. The object detection system 532 may be configured to detect objects in the driving environment 510 and to recognize the detected objects. For example, the object detection system 532 may analyze images captured by the cameras of the optical detection system 532 and may be capable of determining traffic light signals, road signs, roadway layouts (e.g., boundaries of traffic lanes, topologies of intersections, designations of parking places, and so on), presence of obstacles, and the like. The object detection system 532 may further receive the LiDAR (including radar, if applicable) sensing data to determine distances to various objects in the environment 510 and velocities of such objects. In some implementations, the object detection system 532 may use the LiDAR data in combination with the data captured by the camera(s). In one exemplary implementation, the camera(s) may detect an image of a rock partially obstructing a traffic lane. Using the data from the camera(s), the object detection system 532 may be capable of determining the angular size of the rock, but not the linear size of the rock. Using the LiDAR data, the object detection system 532 may determine the distance from the rock and, therefore, by combining the distance information with the angular size of the rock, the object detection system 532 may determine the linear dimensions of the rock as well.

In another exemplary implementation, using the LiDAR data, the object detection system 532 may determine how far a detected object is from the AV and may further determine the component of the object's velocity along the direction of the AV's motion. Furthermore, using a series of quick images obtained by the camera, the object detection system 532 may also determine the lateral velocity of the detected object in a direction perpendicular to the direction of the AV's motion. In some implementations, the lateral velocity may be determined from the LiDAR data alone, for example, by recognizing an edge of the object (using horizontal scanning) and further determining how quickly the edge of the object is moving in the lateral direction.

The object detection system 532 may further receive sensing information from a GPS transceiver configured to obtain information about the position of the AV relative to Earth. The GPS data processing module 534 may use the GPS data in conjunction with the optical sensing data to help accurately determine location of the AV with respect to fixed objects of the driving environment 510, such as roadways, intersections, surrounding buildings, and so on.

In some implementations, the object detection system 532 can include retro-reflection-based object detection sub-system 538 that measures the retro-reflectivity of an object, and uses the measurement to classify the object. As noted above, the retro-reflectometer, as described herein, can be used to determine, obtain, derive or verify the retro-reflectivity of the target (e.g., retro-reflectivity data), which in turn can be used to calibrate or train the retro-reflection-based object detection sub-system 538. In some implementations, retro-reflection-based object detection sub-system 538 may be trained using simulations of virtual driving environments that may include retro-reflection data for various objects or materials derived or obtained from a retro-reflectometer, as described herein.

The data processing system 530 may further include an environment monitoring and prediction component 536, which may monitor how the driving environment 510 evolves with time, e.g., by keeping track of the locations and velocities of the animated objects (relative to Earth). In some implementations, the environment monitoring and prediction component 536 may keep track of the changing appearance of the environment due to motion of the AV relative to the environment. In some implementations, the environment monitoring and prediction component 536 may make predictions about how various animated objects of the driving environment 510 will be positioned within a prediction time horizon. The predictions may be based on the current locations and velocities of the animated objects as well as on the tracked dynamics of the animated objects during a certain (e.g., pre-determined) period of time. For example, based on stored data for object 1 indicating accelerated motion of object 1 during the previous 3-second period of time, the environment monitoring and prediction component 536 may conclude that object 1 is resuming its motion from a stop sign or a red traffic light signal. Accordingly, the environment monitoring and prediction component 536 may predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 536 may conclude that object 2 is stopping at a stop sign or at a red traffic light signal. Accordingly, the environment monitoring and prediction component 536 may predict where object 2 is likely to be within the next 1 or 3 seconds. The environment monitoring and prediction component 536 may perform periodic checks of the accuracy of its predictions and modify the predictions based on new data obtained from the optical sensing system 520.

The data generated by the object detection system 532, the GPS data processing module 534, and the environment monitoring and prediction component 536 may be used by an autonomous driving system, which may be an autonomous vehicle control system (AVCS) 540. The AVCS 540 may include one or more algorithms that control how the AV 500 is to behave in various driving situations and environments. For example, the AVCS 540 may include a navigation system for determining a global driving route to a destination point. The AVCS 540 may also include a driving path selection system for selecting a particular path through the immediate driving environment, which may include selecting a traffic lane, negotiating a traffic congestion, choosing a place to make a U-turn, selecting a trajectory for a parking maneuver, and so on. The AVCS 540 may also include an obstacle avoidance system for safe avoidance of various obstructions (rocks, stalled vehicles, a jaywalking pedestrian, and so on) within the driving environment of the AV. The obstacle avoidance system may be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 540 may generate instructions for various systems and components of the vehicle, such as the powertrain and steering 560, vehicle electronics 562, and other systems and components not explicitly shown in FIG. 5. The powertrain and steering 560 may include an engine (internal combustion engine, electric engine, and so on), transmission, differentials, axles, wheels, steering mechanism, and other systems. The vehicle electronics 562 may include an on-board computer, engine management, ignition, communication systems, carputers, telematics, in-car entertainment systems, and other system and components. Some of the instructions output by the AVCS 540 may be delivered directly to the powertrain and steering 560 whereas other instructions output by the AVCS 540 are first delivered to the vehicle electronics 562, which generate commands to the powertrain and steering 560.

In one example, the AVCS 540 may determine that an obstacle identified by the data processing system 530 is to be avoided by decelerating the vehicle until a safe speed is reached, followed by steering the vehicle around the obstacle. The AVCS 540 may output instructions to the powertrain and steering 560 (directly or via the vehicle electronics 562) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 540 may output instructions to the powertrain and steering 560 to resume the previous speed settings of the vehicle.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "modulating", "emitting", "detecting", "receiving", "generating", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "some implementations" is not intended to mean the same implementation or implementations unless described as such. The terms "first," "second," "third,"

"fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. An apparatus comprising:
    an optical emitter configured to emit a first optical signal along an optical path towards a target object in an outdoor environment;
    an optical detector positioned collinearly to the optical emitter with respect to an optical axis corresponding to the optical emitter, the optical detector configured to detect a second optical signal that is retro-reflected from the target object; and
    a lock-in amplifier coupled to the optical detector, the lock-in amplifier configured to generate, based on the first optical signal and the second optical signal, a signal indicative of a retro-reflectivity of the target object in the outdoor environment.

2. The apparatus of claim 1, further comprising:
    a modulator configured to modulate the first optical signal based on a specified modulation value.

3. The apparatus of claim 2, wherein the lock-in amplifier is further configured to receive a first electrical signal from the modulator and a second electrical signal from the optical detector, wherein the first electrical signal is representative of the first optical signal and the second electrical signal is representative of the second optical signal, and wherein the signal indicative of the retro-reflectivity of the target object in the outdoor environment is a third electrical signal.

4. The apparatus of claim 3, wherein the first electrical signal from the modulator is indicative of the specified modulation value of the first optical signal, and wherein the third electrical signal is indicative of a light intensity of the second optical signal.

5. The apparatus of claim 1, wherein light intensity of the second optical signal, light intensity of the first optical signal, and a distance between the apparatus and a light reflecting surface of the target object is used to generate retro-reflectivity data that identifies a measurement of the retro-reflectivity of the target object within a predefined distance range from the apparatus.

6. The apparatus of claim 5, further comprising an output interface configured to provide an additional signal representative of the retro-reflectivity associated with the target object as a calibration signal to a Light Detection and Ranging (LiDAR) system.

7. The apparatus of claim 1, wherein an output of the optical emitter and the optical detector are positioned in a monostatic configuration where the optical path of the first optical signal and an optical path on which the second optical signal travels to the optical detector share at least in part a same optical path.

8. The apparatus of claim 7, further comprising:
    a converging lens positioned along the optical path, wherein the converging lens, the optical detector, and the output of the optical detector are collinearly positioned.

9. The apparatus of claim 8, further comprising:
    an entrance aperture positioned along the optical path and between the converging lens and the output of the optical emitter; and
    a detector aperture positioned along the optical path between the optical detector and the converging lens.

10. The apparatus of claim 7, further comprising:
    a collector primary mirror positioned along the optical path; and
    a secondary mirror positioned along the optical path, the secondary mirror configured to receive the second optical signal that is reflected from the collector primary mirror and to direct the second optical signal to the optical detector, wherein the collector primary mirror, the secondary mirror, and the output of the optical emitter are collinearly positioned.

11. The apparatus of claim 10, further comprising:
    an entrance aperture positioned along the optical path and collinearly positioned to the collector primary mirror, the secondary mirror, and the output of the optical emitter, wherein the secondary mirror is positioned between the collector primary mirror and the output of the optical emitter; and
    a detector aperture positioned along the optical path and non-collinearly positioned to the collector primary mirror, the secondary mirror, and the output of the optical emitter.

12. The apparatus of claim 1, wherein the optical emitter and the optical detector are positioned in a bistatic configuration where the optical path of the first optical signal and an optical path on which the second optical signal travels to the optical detector do not share a same optical path.

13. A method comprising:
    emitting, by an optical emitter, a first optical signal along an optical path towards a target object in an outdoor environment;
    detecting, by an optical detector positioned collinearly to the optical emitter with respect an optical axis corresponding to the optical emitter, a second optical signal that is retro-reflected from the target object; and
    generating a signal indicative of a retro-reflectivity of the target object in the outdoor environment based on the first optical signal and the second optical signal.

14. The method of claim 13, further comprising:
modulating the first optical signal based on a specified modulation value.

15. The method of claim 14, further comprising:
receiving a first electrical signal representative of the first optical signal and a second electrical signal representative of the second optical signal, wherein the signal indicative of the retro-reflectivity of the target object in the outdoor environment is a third electrical signal.

16. The method of claim 15, wherein the first electrical signal is received from a modulator and is indicative of the specified modulation value of the first optical signal, wherein the second electrical signal is received from the optical detector, and wherein the third electrical signal is generated by a lock-in amplifier and is indicative of a light intensity of the second optical signal.

17. The method of claim 16, wherein generating the third electrical signal comprises:
aligning the first electrical signal and the second electrical signal based on phase;
amplifying the second electrical signal; and
filtering noise components of the second electrical signal.

18. The method of claim 13, further comprising:
determining retro-reflectivity data based on light intensity of the second optical signal, light intensity of the first optical signal, and a distance between an output of the optical emitter and a light reflecting surface of the target object, wherein the retro-reflectivity data identifies a measurement of the retro-reflectivity of the target object within a predefined distance range from the optical emitter.

19. The method of claim 18, further comprising:
providing an additional signal indicative of the retro-reflectivity associated with the target object as a calibration signal to a Light Detection and Ranging (LiDAR) system.

20. The method of claim 13, wherein an output of the optical emitter and the optical detector are positioned in a monostatic configuration where the optical path of the first optical signal and an optical path on which the second optical signal travels to the optical detector share at least in part a same optical path.

* * * * *